United States Patent
Slobodin et al.

(10) Patent No.: US 7,128,421 B2
(45) Date of Patent: Oct. 31, 2006

(54) THERMAL MANAGEMENT OF PROJECTION APPARATUS

(75) Inventors: David E. Slobodin, Lake Oswego, OR (US); T. Scott Engle, Tualatin, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/812,452

(22) Filed: Mar. 29, 2004

(65) Prior Publication Data

US 2005/0213047 A1 Sep. 29, 2005

(51) Int. Cl.
G03B 21/16 (2006.01)
F21V 29/00 (2006.01)
G02F 1/1333 (2006.01)
H04N 5/74 (2006.01)

(52) U.S. Cl. .............................. 353/52; 353/54; 353/56; 353/57; 353/60; 362/264; 362/294; 349/161; 348/748

(58) Field of Classification Search .................. 353/52, 353/54–58, 60, 61; 362/227, 230, 231, 800, 362/500, 580, 218, 264, 294, 345, 373; 349/61, 349/69, 161
See application file for complete search history.

(56) References Cited

U.S. PATENT DOCUMENTS

| | | | |
|---|---|---|---|
| 5,993,008 A | 11/1999 | Hashimukai et al. | |
| 6,072,459 A | 6/2000 | Asakawa et al. | |
| 6,111,630 A | 8/2000 | Watanuki et al. | |
| 6,154,259 A | 11/2000 | Hargis et al. | |
| 6,322,218 B1 * | 11/2001 | Sugawara et al. | 353/52 |
| 2001/0013924 A1 * | 8/2001 | Yokoyama et al. | 353/52 |
| 2002/0163626 A1 | 11/2002 | Takizawa et al. | |
| 2003/0066945 A1 * | 4/2003 | Muthu et al. | 250/205 |
| 2005/0040424 A1 * | 2/2005 | Erchak et al. | 257/100 |
| 2005/0122065 A1 * | 6/2005 | Young | 315/294 |
| 2005/0152146 A1 * | 7/2005 | Owen et al. | 362/294 |

FOREIGN PATENT DOCUMENTS

| | | |
|---|---|---|
| EP | 0 869 388 A1 | 10/1998 |
| JP | 2003297123 | 10/2003 |

* cited by examiner

*Primary Examiner*—W. B. Perkey
*Assistant Examiner*—Rochelle Blackman
(74) *Attorney, Agent, or Firm*—Schwabe Williamson & Wyatt

(57) ABSTRACT

A projection apparatus is formed employing a solid state light source having either an associated or integrated sensor to monitor a thermal condition of a region of the solid state light source. The sensor is equipped to output a signal indicative of the thermal condition of the monitored region. In various embodiments, a controller is also provided to conditionally initiate one or more thermal management actions based at least in part on the thermal condition of the region as indicated by the signal.

20 Claims, 3 Drawing Sheets

THERMAL MANAGEMENT OF PROJECTION APPARATUS

BACKGROUND

Historically, projection engines of projection systems have been designed employing high intensity discharge lamps. These prior art projection engines/systems suffer from a number of disadvantages. For examples, the lamps typically have relatively short lives, and reduced brightness after an initial period of usage. Further, there is an appreciable period of waiting for the lamp to warm up, when a projection engine/system is first turned on. During that period, either no image is available or the available images are of poor quality.

Resultantly, there has been a lot of interest in developing and manufacturing in a mass scale projection engines and projection systems employing solid state light sources. Such engines/systems typically have the aforementioned disadvantages in a lesser degree. However, the issues still have to be addressed.

BRIEF DESCRIPTION OF THE DRAWINGS

Embodiments of the present invention will be described by way of the accompanying drawings in which like references denote similar elements, and in which.

DETAILED DESCRIPTION OF EMBODIMENTS OF THE INVENTION

Embodiments of the present invention include but are not limited to thermally managed projection engines and projection systems.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
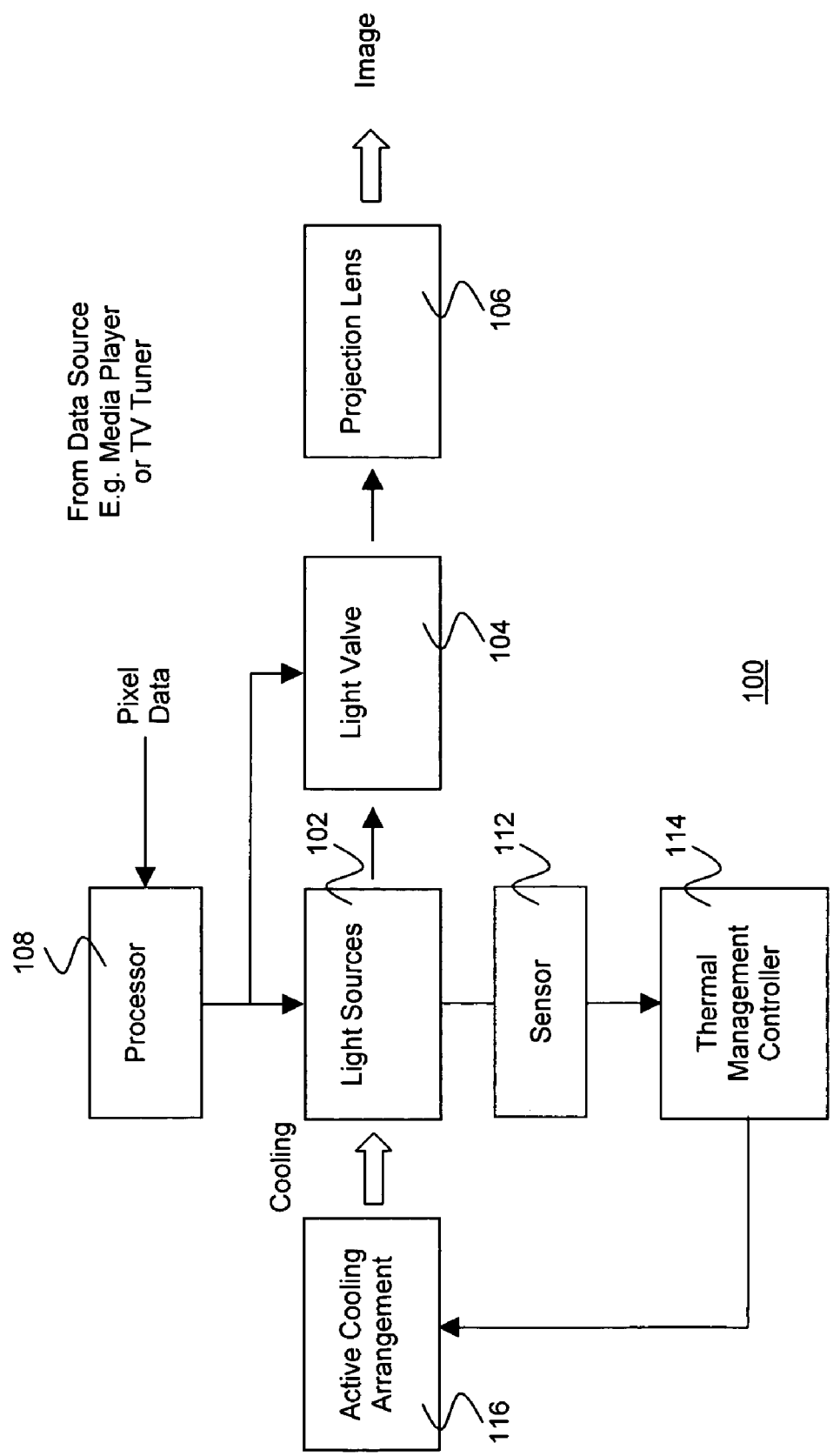
FIG. 1 illustrates a block diagram view of a projection engine/system in accordance with one embodiment of the present invention.

FIG. 1 illustrates a block diagram view of a projection engine (which may be a portion of a projection system) 100 in accordance with one embodiment of the present invention. As illustrated, for the embodiment, projection engine/system 100 includes light sources 102, light valve 104, projection lens 106, optically coupled to each other as shown. Additionally, for the embodiment, projection engine/system 100 includes sensors 112 and active cooling arrangement 116 thermally coupled to light sources 102, as shown. Further, for the embodiment, projection engine/system 100 includes processor, electrically coupled to light sources 102 and light valve 104 as shown, and thermal management controller 114, electrically coupled to sensors 112 and active cooling arrangement 116 as shown.

Light sources 102 are employed to provide a number of primary color light bundles. In various embodiments, the primary color light bundles comprise a red, a blue and a green light bundle. In alternate embodiments, other primary color light bundles may be provided instead.

In various embodiments, light sources 102 comprise solid state light sources. More specifically, in some embodiments, light sources 102 comprise light emitting diodes (LED), whereas in other embodiments, light sources 102 comprise laser diodes.

Light valve 104 is employed to selectively direct the primary color light bundles to projection lens 106. A wide range of light valves, including but are not limited digital micro-mirror devices, may be employed to implement these elements.

Projection lens 106 project the focused primary color light bundles onto a surface. Likewise, a wide range of projection lens may be employed to implement projection lens 106.

Sensors 112 are employed to monitor one or more thermal conditions of one or more regions or locations of one or more of light sources 102. In various embodiments, sensors 112 are external, but proximally disposed to the regions/locations they monitor. In other embodiments, e.g. where light sources 102 are solid state light sources, sensors 112 are integrated with the light sources at the regions/locations of interest. Typically, but not necessarily, they are integrated to monitor the thermal conditions of a number of critical junctions of the solid state light sources.

Sensors 112 are designed to output signals that are indicative of the thermal conditions of the corresponding regions/locations they monitor. In various embodiments, the output signals may be analog signals, and analog to digital converters may be employed to convert the signals to digital signals.

Active cooling arrangement 116 is employed to actively cool light sources 102. In various embodiments, active cooling arrangement 116 may be a fan capable of operating at various speeds to provide various rates of air flow to cool light sources 102. In other embodiments, active cooling arrangement 116 may be a TE (thermoelectric) cooler capable of operating at various levels to provide various rates of heat removal to cool light sources 102. In yet other embodiments, active cooling arrangement 116 may be a liquid cooling arrangement with pipes and pump capable of operating at various levels to provide various rates of fluid flow to cool light sources 102.

Thermal management controller 114 is employed to control the operation of active cooling arrangement 116 based at least in part on the signals outputted by sensors 112. In general, thermal management controller 114 is designed to cause active cooling arrangement 116 to impart more cooling on light sources 102 when the thermal condition of light sources exceeds an upper end operational threshold, and to impart less cooling light sources 102 when the thermal condition of light sources is under a lower end operational threshold. In various embodiments, additional thresholds may be employed to further increase or decrease cooling levels as the sensors indicate the current operating state being further from the desired set point.

In various embodiments, the thresholds and response may be designed to achieve one or more of a number of system objectives. These system objectives may include but are not limited to extending the operational life of solid state light sources, reducing system acoustics, increasing or maximizing brightness and so forth.

The thresholds and response are application dependent, i.e. dependent on the thermal characteristics of the light sources and the cooling capability of the active cooling arrangement. The thresholds and response for a particular combination of light sources and active cooling arrangement may be empirically determined.

Still referring to FIG. 1, processor 108 is employed to control light sources 102 and light valve 104, to project images based on the pixel data of the images received. In some embodiments, the pixel data may be provided e.g. from an external computing/media device or an integrated TV tuner (through e.g. an input interface). A wide range of general or special purpose processors may be employed to implement processor 108.

In various embodiments, processor 108 and thermal management controller 114 may be combined.

In various embodiments, projection system 100 is a projector. In other embodiments, projection system 100 is a projection television.

Figure 2:
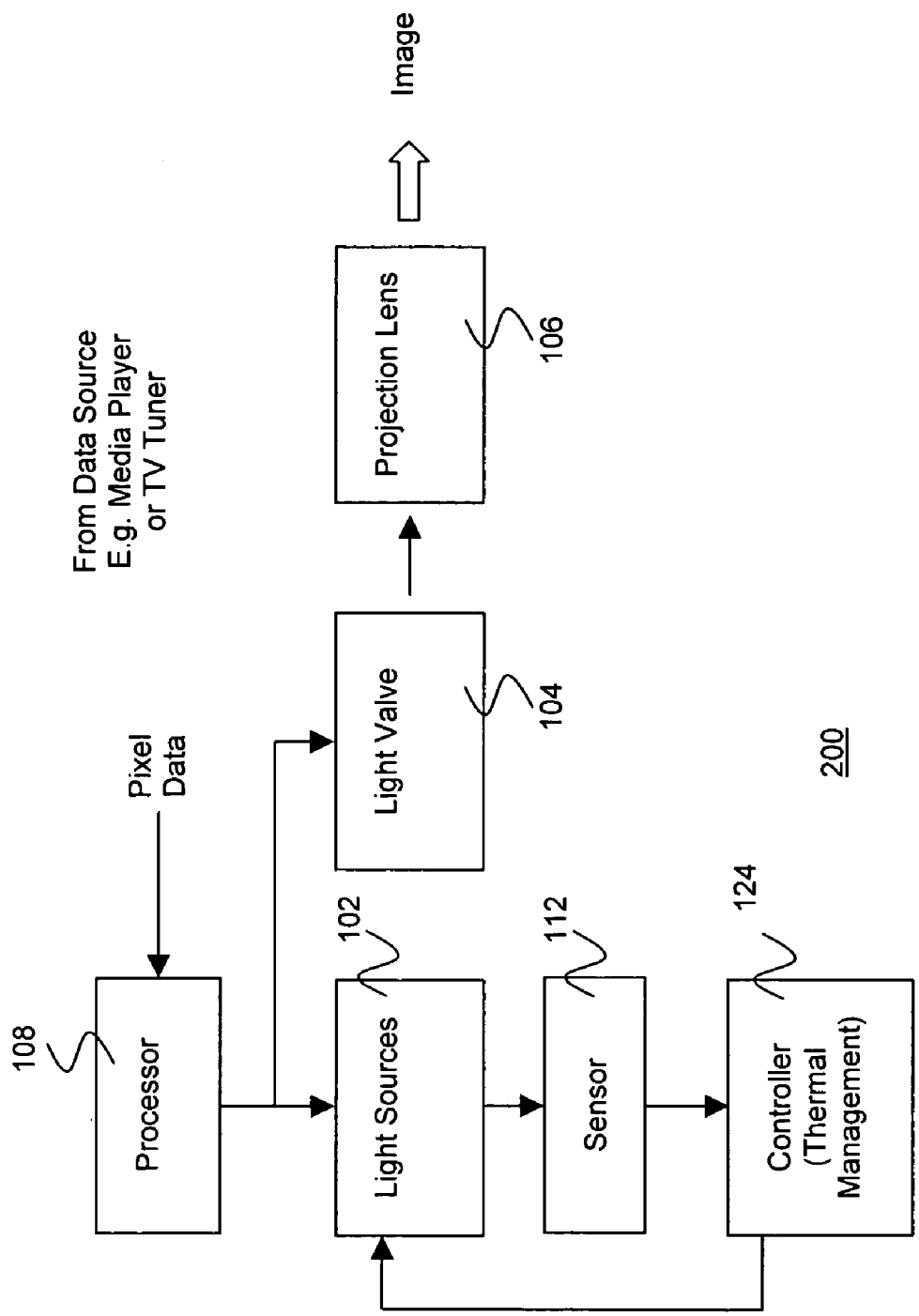
FIG. 2 illustrates a block diagram view of another projection engine/system in accordance with another embodiment of the present invention.

FIG. 2 illustrates a block diagram view of another projection engine/system in accordance with another embodiment of the present invention. Similar to engine/system 100, engine/system 200 comprises light sources 102, light valve 104 and projection lens 106 optically coupled to each other, and sensors 112 thermally coupled to the light sources 102, as earlier described. Likewise, engine/system 200 comprises thermal management controller 124 and processor 108 electrically coupled to sensor 112 and light sources/valve 102/ 104.

However, unlike thermal management controller 114 of engine/system 100, thermal management controller 124 of engine/system 200 is electrically coupled to the drive circuitry of light sources 102. Further, thermal management controller 124 is designed to manage the thermal condition of light sources 102 by causing the drive circuitry of light sources 102 to vary the amounts of voltage or current it applies to drive light sources 102. In various embodiments, thermal management controller 124 may indicate to the drive circuitry of light sources 102 the amount of voltage or current the drive circuitry should vary.

As the embodiment of FIG. 1, thermal management controller 124 manages the thermal condition of light sources 102 based at least in part on the thermal condition indicated by the signals outputted by sensors 112. Likewise, thermal management controller 124 may manage the thermal condition to achieve one or more of the earlier described system objectives.

Figure 3:
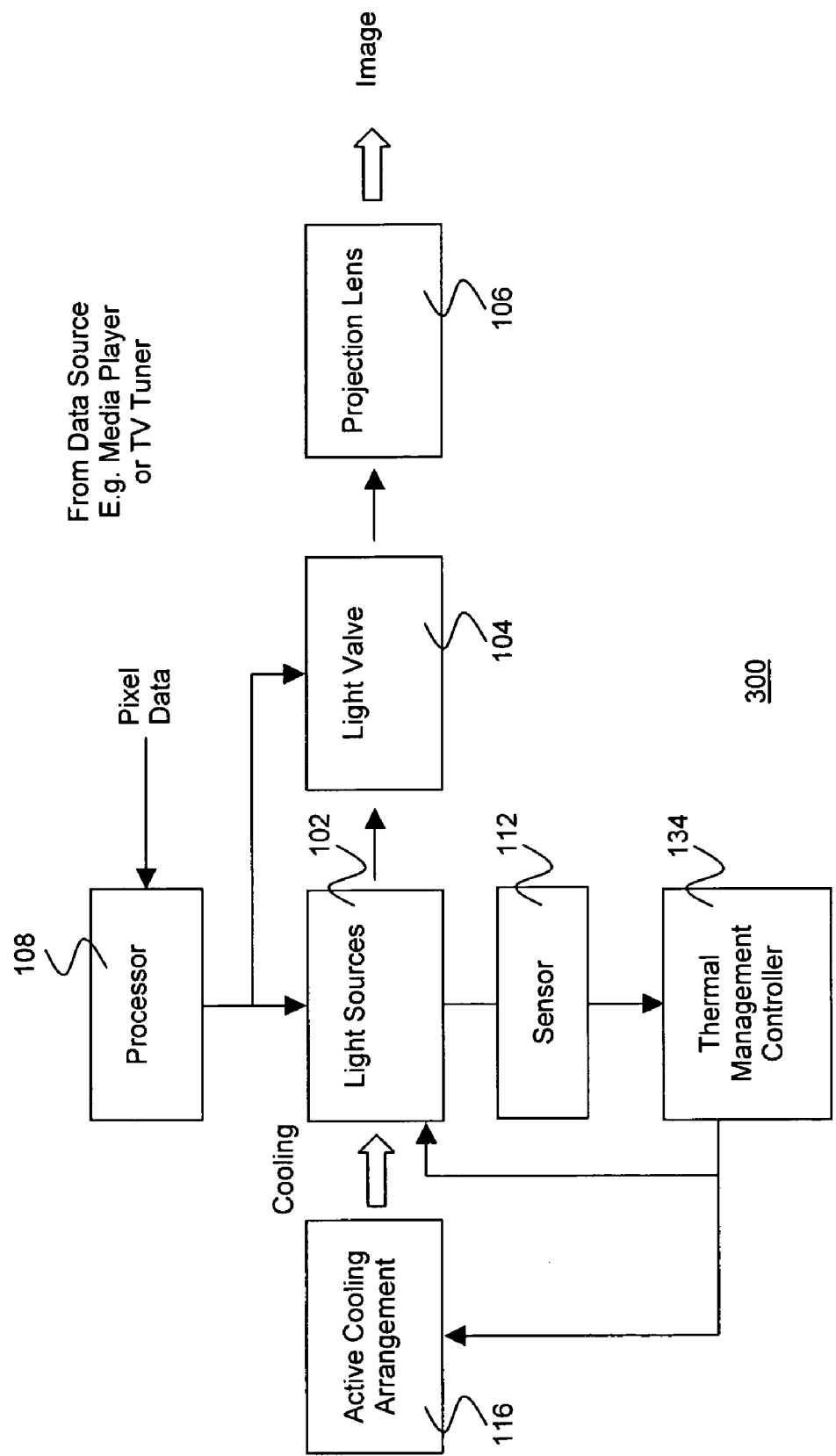
FIG. 3 illustrates a block diagram view of yet another projection engine/system in accordance with yet another embodiment of the present invention.

FIG. 3 illustrates a block diagram view of yet another projection engine/system in accordance with yet another embodiment of the present invention. Engine/system 300 is the union of engine/system 100 and engine/system 200. That is, similar to engine/systems 100 and 200, engine/system 300 comprises light sources 102, light valve 104 and projection lens 106 optically coupled to each other, and sensors 112 thermally coupled to the light sources 102, as earlier described. Likewise, engine/system 300 comprises thermal management controller 134 and processor 108 electrically coupled to sensor 112 and light sources/valve 102/104 respectively. Further, engine/system 300 comprises active cooling arrangement 116, electrically coupled to thermal management controller 134, which is also electrically coupled to the drive circuitry of light sources 102.

For the embodiment, thermal management controller 134 is designed to manage the thermal condition of light sources 102 by selectively managing the amount of cooling imparted by active cooling arrangement 116 as well as the amounts of voltage or current applied by the drive circuit of light sources 102 to drive light sources 102.

As the embodiments of FIG. 1–2, thermal management controller 134 may manage the thermal condition of light sources 102 based at least in part on the thermal condition indicated by the signals outputted by sensors 112. Likewise, thermal management controller 134 may manage the thermal condition to achieve one or more of the earlier described system objectives. Thermal management controller 134 may vary the operation of active cooling arrangement 116 and the drive circuitry of light sources 102 in tandem, or in succession.

Thus, it can be seen from the above description, a thermally managed projection engine/system has been described. While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. A projection system comprising:
   a solid state light source;
   a power supply coupled to the solid state light source to provide power to the solid state light source;
   a sensor either coupled to or integrated with the solid state light source to monitor a region of the solid state light source for a thermal condition, and output a signal indicative of the thermal condition of the monitored region;
   an active cooling arrangement thermally coupled to the solid state light source to provide more than one level of cooling to the solid state light source; and
   a controller coupled to the sensor and the active cooling arrangement to conditionally initiate a selective level of cooling to the solid state light source using the active cooling arrangement based at least in part on the thermal condition of the region as indicated by the signal.

2. The projection system of claim 1, wherein the solid state light source comprises a selected one of a light emitting diode and a laser diode.

3. The projection system of claim 1, wherein the controller is designed to control operations of the active cooling arrangement to impart more cooling to the solid state light source when the thermal condition of the region exceeds an upper end operational threshold and/or to impart less cooling to the solid state light source when the thermal condition of the region is under a lower end operational threshold.

4. The projection system of claim 1, wherein the active cooling arrangement comprises a fan, and the controller controls a speed of the fan, varying an amount of air flow the fan drives pass the solid state light source.

5. The projection system of claim 1, wherein the active cooling arrangement comprises a cooling pipe, and the controller controls a flow rate of the cooling pipe, varying an amount of fluid flow pass the solid state light source from no fluid flow to a selective one of multiple levels of fluid flows.

6. The projection system of claim 1, wherein the active cooling arrangement comprises a thermoelectric cooler, and the controller controls an operation level of the thermoelectric cooler, varying an amount of heat being removed from the solid state light source.

7. The projection system of claim 3, wherein the projection system further comprises drive circuitry coupled to the solid state light source to drive the solid state light source, and the controller is further coupled to the drive circuitry to influence its operation, indicating to the drive circuitry to vary an amount of drive voltage or current the drive circuitry applies to the solid state light source, based at least in part on the thermal condition indicated by the signal.

8. The projection system of claim 1, wherein the projection system further comprises drive circuitry coupled to the solid state light source to drive the solid state light source, and the controller is coupled to the drive circuitry to influence its operation, indicating to the drive circuitry to vary an amount of drive voltage or current the drive circuitry applies to the solid state light source, based at least in part on the thermal condition indicated by the signal.

9. The projection system of claim 1, wherein the projection system further comprises
  a processor coupled to the light source to control the light source to project an image; and
  an input interface coupled to the processor to facilitate input to the processor pixel data of the image.

10. The projection system of claim 9, wherein the processor comprises the controller.

11. The projection system of claim 9, wherein the projection system further comprises a television tuner coupled to the input interface.

12. In a projection apparatus, a method of operation comprising:
  monitoring a region of a solid state light source of the projection apparatus for thermal condition through a sensor either coupled to or integrated with the solid state light source, and outputting a signal indicative of the thermal condition of the monitored region, the solid state light source being coupled to a power supply to supply power to the solid state light source; and
  conditionally initiating, based at least in part on the thermal condition of the region as indicated by the signal, a selective level of cooling from a plurality of levels of cooling using an active cooling arrangement that is thermally coupled to the solid state light source and adapted to provide more than one level of cooling to the solid state light source.

13. The method of claim 12, wherein said conditionally initiating of a selective level of cooling comprises conditionally controlling the active cooling arrangement to impart more cooling on the solid state light source when the thermal condition of the region exceeds an upper end operational threshold and/or to impart less cooling to the solid state light source when the thermal condition of the region is under a lower end operational threshold.

14. The method of claim 12, wherein said conditionally initiating of a selective level of cooling comprises conditionally controlling the active cooling arrangement by controlling a speed of a fan, varying an amount of air flow the fan drives pass the solid state light source.

15. The method of claim 12, wherein said conditionally initiating of a selective level of cooling comprises conditionally controlling the active cooling arrangement by controlling an operation level of a thermoelectric cooler, varying an amount of heat being removed from the solid state light source.

16. The method of claim 12, wherein said conditionally initiating of a selective level of cooling comprises conditionally controlling the active cooling arrangement by controlling a flow rate of a cooling pipe, varying an amount of fluid flowing pass the solid state light source from no fluid flow to a selective one of multiple levels of fluid flows.

17. The method of claim 13, wherein the method further comprises applying selective amount of voltage and current to drive the solid state light source, and conditionally indicating a variation to the selective amount of the voltage and the current to be applied, based at least in part on the thermal condition indicated by the signal.

18. The method of claim 12, wherein the method further comprises applying selective amount of voltage and a current to drive the solid state light source, and conditionally indicating a variation to the selective amount of the voltage and the current to be applied, based at least in part on the thermal condition indicated by the signal.

19. A projection apparatus comprising:
  solid state light source means for providing light;
  power supply means coupled to the solid state light source means to provide power to the solid state light source means;
  means for monitor of a region of the solid state light source means for a thermal condition, and output a signal indicative of the thermal condition of the monitored region;
  an active cooling means thermally coupled to the solid state light source means to provide more than one level of cooling to the solid state light source means; and
  controller means for conditionally initiating a selective level of cooling using the active cooling means based at least in part on the thermal condition of the region as indicated by the signal.

20. The projection apparatus of claim 19, wherein the controller means is designed to control operations of the active cooling means to impart more cooling to the solid state light source means when the thermal condition of the region exceeds an upper end operational threshold and/or to impart less cooling to the solid state light source means when the thermal condition of the region is under a lower end operational threshold.

* * * * *